United States Patent
Alovert et al.

(10) Patent No.: US 12,106,162 B1
(45) Date of Patent: Oct. 1, 2024

(54) CRYPTOGRAPHICALLY-SECURED SYSTEMS CONFIGURED TO EXECUTE EVENTS-BASED COMMUNICATION PROTOCOLS AND ARCHITECTURES, AND METHODS OF USE THEREOF

(71) Applicant: BMIC LLC, Dallas, TX (US)

(72) Inventors: Igor Alovert, Morristown, NJ (US); Xavier Riley, San Jose, CA (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/600,244

(22) Filed: Mar. 8, 2024

Related U.S. Application Data

(60) Provisional application No. 63/489,361, filed on Mar. 9, 2023.

(51) Int. Cl.
H04L 9/00 (2022.01)
G06F 9/54 (2006.01)
G06F 21/60 (2013.01)

(52) U.S. Cl.
CPC ............ G06F 9/542 (2013.01); G06F 21/602 (2013.01); H04L 9/50 (2022.05); *G06Q 2220/00* (2013.01); *H04L 2209/56* (2013.01)

(58) Field of Classification Search
CPC ............ G06Q 2220/00; G06Q 20/389; G06Q 20/401; G06Q 20/02; G06Q 20/38215; G06Q 20/4014; H04L 9/50; H04L 2209/56
See application file for complete search history.

(56) References Cited

U.S. PATENT DOCUMENTS

| | | | |
|---|---|---|---|
| 10,567,320 B2 | 2/2020 | Chalakudi et al. | |
| 11,405,373 B2 | 8/2022 | McMurdie et al. | |
| 2019/0394175 A1 | 12/2019 | Zhang et al. | |
| 2020/0074113 A1* | 3/2020 | DeRosa-Grund | G06Q 20/3829 |
| 2021/0058353 A1 | 2/2021 | Creech et al. | |
| 2021/0217098 A1 | 7/2021 | Fang | |
| 2021/0243036 A1 | 8/2021 | Martin et al. | |
| 2021/0374672 A1* | 12/2021 | Hunn | G06Q 10/10 |
| 2022/0239508 A1* | 7/2022 | Liu | H04L 9/50 |
| 2022/0318907 A1 | 10/2022 | Bleznak et al. | |
| 2022/0337436 A1 | 10/2022 | Beaudet et al. | |
| 2023/0062434 A1* | 3/2023 | Wagner | H04L 9/3247 |

* cited by examiner

*Primary Examiner* — Brian W Wathen
(74) *Attorney, Agent, or Firm* — GREENBERG TRAURIG, LLP

(57) ABSTRACT

A system for providing cryptographically-secured communication is disclosed. The system receives activities from clients including data for inclusion on a distributed ledger of a distributed ledger architecture. The system then processes each activity and determines whether an activity corresponds to an event subscribed to by at least one computing device. The event may correspond to the presence of a communication in an activity received by the system. The system validates the data associated with the activity by utilizing a plurality of validators and without requiring a threshold level of consensus if the activity corresponds to the event. If the activity does not correspond to the event, the system validates using the threshold level of consensus. Once the activity is validated, the system submits the data associated with the activity for inclusion on the distributed ledger so that the communication is made available to the at least one off-chain computing device.

20 Claims, 6 Drawing Sheets

CRYPTOGRAPHICALLY-SECURED SYSTEMS CONFIGURED TO EXECUTE EVENTS-BASED COMMUNICATION PROTOCOLS AND ARCHITECTURES, AND METHODS OF USE THEREOF

CROSS-REFERENCE TO RELATED APPLICATIONS

The present application claims priority to and the benefit of U.S. Provisional Application 63/489,361, filed on Mar. 9, 2023, the entirety of which is hereby incorporated by reference in its entirety.

FIELD OF THE INVENTION

The present application relates to cryptographically-secured technologies, communication technologies, roofing technologies, and, more particularly to cryptographically-secured systems configured to execute events-based communication protocols and architectures, and methods of use thereof.

BACKGROUND

Typically, a cryptographically-secured architecture may rely on distributed control and decision-making capabilities among network nodes.

SUMMARY

In certain embodiments, a system may include a memory that stores instructions and a processor that executes the instructions to configure to the processor to perform operations to facilitate an events-based communication protocol is provided. In certain embodiments, the processor may be configured to facilitate establishment of an event handler connection to one or more events associated with one or more self-executed routines of a distributed ledger architecture of the system including a distributed ledger. In certain embodiments, the one or more events may correspond to a type of content associated with an activity received by the system including data for inclusion onto the distributed ledger. For example, in certain embodiments, the one or more events may correspond to the presence of a communication in an activity received by the system. In certain embodiments, the processor may be configured to receive and/or process a first activity associated with the one or more self-executed routines and received by the system for inclusion on the distributed ledger. In certain embodiments, the processor may be configured to determine, such as based on processing the first activity, that the first activity corresponds to the one or more events based on the first activity including a first communication. In certain embodiments, the processor may be configured to validate, such as by utilizing a plurality of validators and based on the first activity being determined to correspond to the one or more events, data associated with the first activity for inclusion on the distributed ledger of the distributed ledger architecture. In certain embodiments, the validation may be conducted without requiring a threshold level of consensus from the plurality of validators since the first activity corresponds to the one or more subscribed-to events. In certain embodiments, the processor may be configured to submit the data associated with the first activity for inclusion on the distributed ledger of the distributed ledger architecture so that the first communication may be provided via the distributed ledger of the distributed ledger architecture to one or more off-chain computing devices of the system, such as for display.

In certain embodiments, the processor may be further configured to independently monitor a state of the distributed ledger architecture of the system. In certain embodiments, the processor may be further configured to verify the state of the distributed ledger architecture of the system based on the monitoring. In certain embodiments, the processor may be further configured to determine that the first activity does not correspond to the one or more events if the first activity does not include the communication. In certain embodiments, the processor may be further configured to reject the first activity for inclusion on the distributed ledger if the first activity does not correspond to the one or more events. In certain embodiments, the processor may be further configured to validate, if the first activity does not include the communication, the first activity requiring the threshold level of consensus from the plurality of validators. In certain embodiments, the processor may be further configured to submit data associated with the first activity for inclusion on the distributed ledger after validating the first activity requiring the threshold level of consensus from the plurality of validators.

In certain embodiments, the processor may be further configured to facilitate assignment of the one or more self-executed routines to the one or more computing devices. In certain embodiments, the processor may be further configured to store the one or more self-executed routines on the distributed ledger of the distributed ledger architecture of the system. In certain embodiments, the processor may be further configured to execute the one or more self-executed routines to facilitate generation of the one or more events based on processing of the first activity associated with the one or more self-executed routines. In certain embodiments, the first communication of the first activity included on the distributed ledger of the distributed ledger architecture may be obtained by a full node communicatively linked to the one or more off-chain computing devices. In certain embodiments, the processor may be further configured to track a time taken to validate the data associated with the first activity. In certain embodiments, the one or more off-chain computing devices may be configured to display the time taken to validate the first activity with the first communication.

In certain embodiments, the processor may be further configured to process a second activity associated with the one or more self-executed routines and received by the system. In certain embodiments, the processor may be further configured to determine, such as based on the processing, that the second activity corresponds to the one or more events based on the second activity including a second communication. In certain embodiments, the processor may be further configured to validate, by utilizing the plurality of validators and based on the second activity being determined to correspond to the one or more events, the data associated with the second activity for inclusion on the distributed ledger of the distributed ledger architecture without requiring the threshold level of consensus from the plurality of validators. In certain embodiments, the processor may be further configured to generate a result object address associated with the first activity after processing and validating the first activity. In certain embodiments, the first communication may be retrievable via the result object address by a full node in communication with the one or more off-chain computing devices.

In certain embodiments, a method for providing a cryptographically-secured communication protocol is provided.

In certain embodiments, the method may include facilitating establishment of an event handler connection for one or more events associated with one or more self-executed routines of a distributed ledger architecture of a system including a distributed ledger. In certain embodiments, the one or more events may correspond to the presence of a communication in an activity received by the system. In certain embodiments, the method may include analyzing a first activity associated with the one or more self-executed routines and received by the system for inclusion on the distributed ledger. In certain embodiments, the method may include determining, such as based on the analyzing and by executing the one or more self-executed routines, that the first activity corresponds to the one or more events based on the first activity including a first communication. In certain embodiments, the method may include validating, by utilizing a plurality of validators and based on the first activity being determined to correspond to the one or more events, data associated with the first activity for inclusion on the distributed ledger of the distributed ledger architecture without requiring a threshold level of consensus from the plurality of validators. In certain embodiments, the method may include including the first activity on the distributed ledger of the distributed ledger architecture so that the first communication is made available to one or more off-chain computing devices of the system.

In certain embodiments, the method may include enabling the first communication to be provided to the one or more off-chain computing devices in response to a remote procedure call. In certain embodiments, the method may include executing the one or more self-executed routines upon receipt of the first activity associated with the one or more self-executed routines. In certain embodiments, the method may include interrogating, after validating data associated with the first activity for inclusion on the distributed ledger of the distributed ledger architecture, a result object address associated with the first activity to obtain the first communication. In certain embodiments, the method may include receiving an acknowledgement from the one or more off-chain computing devices after the one or more off-chain computing devices obtains the first communication, accesses the first communication, or a combination thereof.

In certain embodiments, a non-transitory computer readable medium comprising instructions, which, when loaded and executed by a processor, cause the processor to be configured to facilitate a cryptographically-secured events-based communication protocol is provided. In certain embodiments, the processor may be configured to receive an activity for inclusion on a distributed ledger of a distributed ledger architecture of a system. In certain embodiments, the processor may be configured to validate, by utilizing a plurality of validators and based on the activity corresponding to one or more events subscribed to by one or more computing devices, data associated with the activity for inclusion on the distributed ledger of the distributed ledger architecture without requiring a threshold level of consensus from the plurality of validators. In certain embodiments, the one or more events may correspond to the presence of a communication in the activity. In certain embodiments, the processor may be configured to submit the data associated with the first activity for inclusion on the distributed ledger of the distributed ledger architecture so that the communication is made available to one or more off-chain computing devices of the system. In certain embodiments, the processor may be configured to receive an acknowledgement from the one or more off-chain computing devices that the message has been accessed by the one or more off-chain computing devices, obtained by the one or more off-chain computing devices, or a combination thereof. In certain embodiments, the processor may be further configured to analyze the activity to determine the presence of the communication in the activity. In certain embodiments, the processor may be further configured to sign the activity utilizing an encrypted key.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
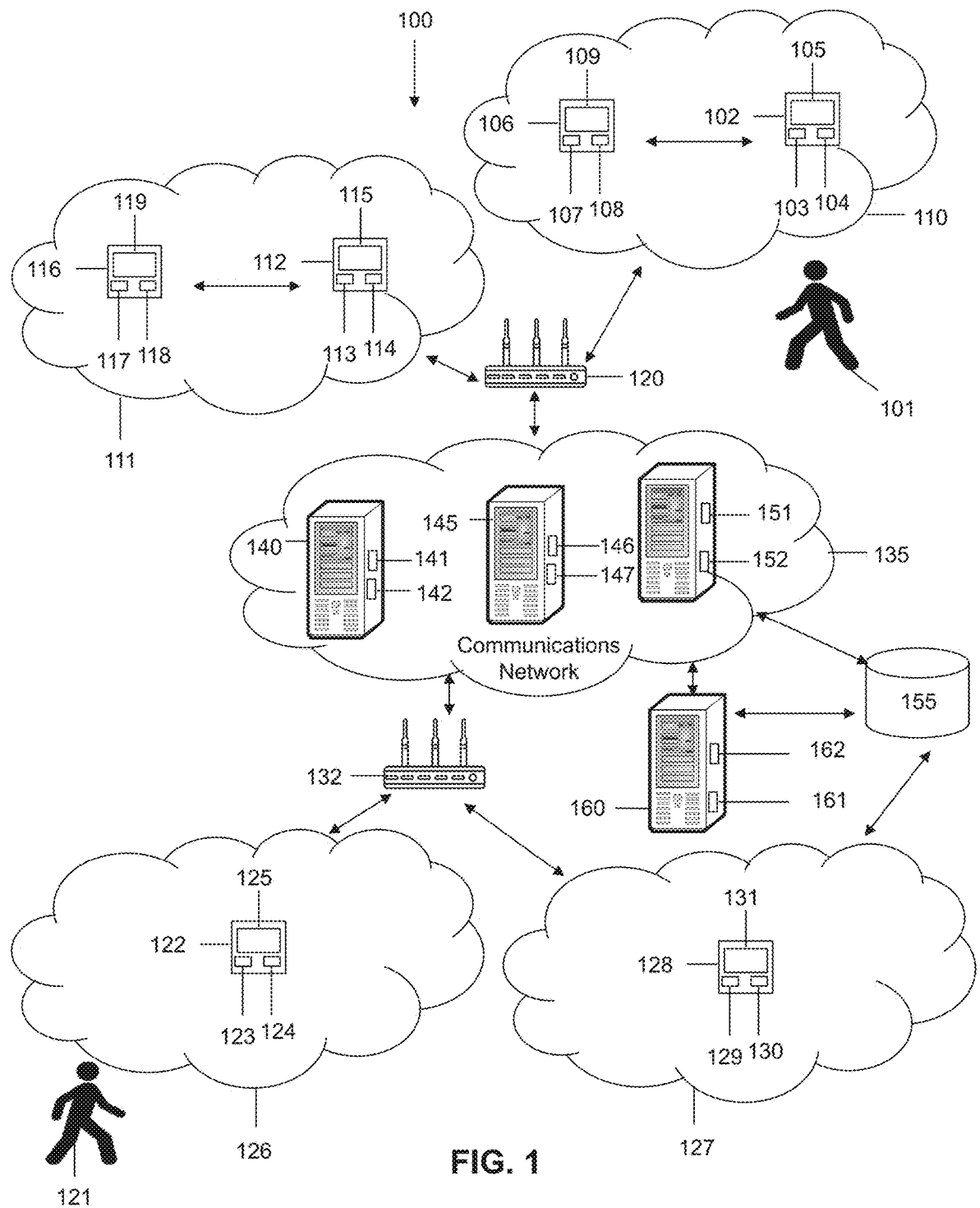
FIG. 1 illustrates an exemplary system for providing a cryptographically-secured events-based communication protocol according to embodiments of the present disclosure.

The following disclosure describes various embodiments for a system 100 and accompanying methods for providing a cryptographically-secured events-based communication protocol utilizing distributed ledger architecture functionality and features. In certain embodiments, the system 100 and methods involve utilizing event tracking or listening to facilitate the distribution of messages or communications to devices subscribing to the events and/or devices in communication with devices subscribing to the events. In certain embodiments, the system 100 and methods may incorporate the use of full nodes that may be connected to a distributed ledger architecture (e.g., a blockchain) which may subscribe to events of any type, such as communications. Computing devices (e.g., Raspberry Pi or other computing devices) and accessory devices to the computing devices that, in certain embodiments, may be off the distributed ledger architecture may be communicatively linked to the full nodes and may be configured to run in a local environment, such as in a home or on a roof of a structure. In certain embodiments, for example, the computing devices may include unique endpoints assigned with a self-executed routine (e.g., a smart contract) that enables a communication associated with an activity (e.g., a transaction) received by the system 100 to be displayed on a screen of the computing device, an accessory device of the computing device, or a combination thereof.

As activities enter the system 100, the system 100 and methods may analyze and/or process the activities to determine whether each activity corresponds to the subscribed-to event. In certain embodiments, the determining may be conducted based on execution of the self-executed routine when each activity enters the system 100. In certain embodiments, for each activity that is determined to correspond to the subscribed-to event, the data associated with such activities may be validated by one or more validators of the distributed ledger architecture without requiring a threshold level of consensus. In such scenarios, the data associated with such activities may be submitted for inclusion on the distributed ledger of the distributed ledger architecture so that the full node may access content (e.g., messages) associated with the communications and provide the communications to the off-chain computing devices and/or accessory devices off the blockchain, such as for display. For activities that are determined not to be associated with a subscribed-to event, such activities and corresponding data may be processed and validated using a threshold level of consensus. For example, if the subscribed-to event is a communication and the activity does not include a communication, a threshold number of validators (e.g., 75% or other threshold) may need to validate the activity for the activity and associated data to be included on the distributed ledger of the distributed ledger architecture of the system 100.

In certain embodiments, the system 100 may incorporate any of the functionality and features of the Sui decentralized permissionless smart contract platform (e.g., as described in "The Sui Smart Contracts Platform" by the MystenLabs Team) and may incorporate the use of Move programming language. However, in certain embodiments, other decentralized smart contract and/or self-executed routine platforms may be utilized, and any type of programming languages may be utilized to support the functionality of the system 100 and methods described herein, such as, but not limited to, those providing low-latency management of assets, which may be defined as objects. In certain embodiments, the system 100 may be configured to process activities (e.g., transactions), execute self-executed routines (e.g., smart contracts), and conduct activity validation in parallel (e.g., for activities involving objects without shared mutability (e.g., owned objects) or for activities that are read-only). Additionally, the system 100 and methods may utilize Byzantine consistent broadcast protocol between validators (e.g., computing nodes of a distributed ledger) and/or other componentry of the system 100 to ensure the security of operations conducted on assets, which may support reduction in latency and enhanced scalability. In certain embodiments, the Byzantine protocol requiring consensus from validators may be utilized for activities that contain objects that are shared among a plurality of owners, however, in certain embodiments, for objects that are not shared or are only owned by one owner, such activities may be approved without consensus (e.g., may be approved by a single validator or less than a majority of validators) to expedite processing of such activities (e.g., transactions including messages that are created and sent from one party and are intended to be sent to one or more recipient parties).

In certain embodiments, a system for providing a cryptographically-secured communication protocol may include a memory that stores instructions and a processor that executes the instructions to configure the processor to perform operations to facilitate decentralized messaging is provided. In certain embodiments, the processor may be configured to facilitate establishment of an event handler connection to facilitate subscription to one or more events associated with one or more self-executed routines of a distributed ledge architecture of the system including a distributed ledger. In certain embodiments, the one or more events may correspond to a type of content associated with an activity received by the system for inclusion onto the distributed ledger. For example, in certain embodiments, the one or more events may correspond to the presence of a communication (e.g., a message) in activity received by the system. In certain embodiments, the processor may be configured to process a first activity associated with the one or more self-executed routines and received by the system for inclusion on the distributed ledger. In certain embodiments, the processor may be configured to determine, such as based on the processing, that the first activity corresponds to the one or more events based on the first activity including a first communication. In certain embodiments, the processor may be configured to validate, such as by utilizing a plurality of validators and based on the first activity being determined to correspond to the one or more events, the first activity for inclusion on the distributed ledger of the distributed ledger architecture. In certain embodiments, the validation may be conducted without requiring a threshold level of consensus from the plurality of validators since the first activity corresponds to the one or more subscribed-to events. In certain embodiments, the processor may be configured to submit the data associated with the first activity for inclusion on the distributed ledger of the distributed ledger architecture so that the first communication may be provided via the distributed ledger of the distributed ledger architecture to one or more off-chain computing devices of the system, such as for display.

In certain embodiments, the processor may be further configured to independently monitor a state of the distributed leger architecture (e.g., a blockchain) of the system. In certain embodiments, the processor may be further configured to verify the state of the distributed ledger architecture of the system based on the monitoring. In certain embodiments, the processor may be further configured to determine that the first activity does not correspond to the one or more events if the first activity does not include the communication. In certain embodiments, the processor may be further configured to reject the first activity and associated data for inclusion on the distributed ledger if the first activity does not correspond to the one or more events. In certain embodiments, the processor may be further configured to validate, if the first activity does not include the communication, the first activity requiring the threshold level of consensus from the plurality of validators. In certain embodiments, the processor may be further configured to submit the data associated with the first activity for inclusion on the distributed ledger after validating the data associated with the first activity requiring the threshold level of consensus from the plurality of validators.

In certain embodiments, the processor may be further configured to facilitate assignment of the one or more self-executed routines to the one or more off-chain computing devices. In certain embodiments, the processor may be further configured to store the one or more self-executed routines on the distributed ledger of the distributed ledger architecture of the system. In certain embodiments, the processor may be further configured to execute the one or more self-executed routines to facilitate generation of the one or more events based on processing of the first activity associated with the one or more self-executed routines. In certain embodiments, the first communication of the activity included on the distributed ledger of the distributed ledger architecture may be obtained by a full node communicatively linked to the one or more off-chain computing devices. In certain embodiments, the processor may be further configured to track a time taken to validate the first activity and/or associated data. In certain embodiments, the one or more computing devices may be configured to display the time taken to validate the first activity with the first communication.

In certain embodiments, the processor may be further configured to process a second activity associated with the one or more self-executed routines and received by the system. In certain embodiments, the processor may be further configured to determine, such as based on the processing, that the second activity corresponds to the one or more events based on the second activity including a second communication. In certain embodiments, the processor may be further configured to validate, by utilizing the plurality of validators and based on the second activity being determined to correspond to the one or more events, the second activity for inclusion on the distributed ledger of the distributed ledger architecture without requiring the threshold level of consensus from the plurality of validators. In certain embodiments, the processor may be further configured to generate a result object address associated with the first activity after processing and validating the first activity. In certain embodiments, the first communication may be retrievable via the result object address by a full node in communication with the at least one computing device.

In certain embodiments, a method for providing a cryptographically-secured events-based communication protocol is provided. In certain embodiments, the method may include facilitating subscription to one or more events associated with one or more self-executed routines of a distributed ledger architecture of a system including a distributed ledger, such as by establishing an event handler connection. In certain embodiments, the one or more events may correspond to the presence of a communication (e.g., a message) in an activity received by the system. In certain embodiments, the method may include analyzing a first activity associated with the one or more self-executed routines and received by the system for inclusion on the distributed ledger. In certain embodiments, the method may include determining, based on the analyzing and by executing the one or more self-executed routines, that the first activity corresponds to the one or more events based on the first activity including a first communication. In certain embodiments, the method may include validating, by utilizing a plurality of validators and based on the first activity being determined to correspond to the one or more events, the first activity for inclusion on the distributed ledger of the distributed ledger architecture without requiring a threshold level of consensus from the plurality of validators. In certain embodiments, the method may include including the first activity and/or data associated therewith on the distributed ledger of the distributed ledger architecture so that the first communication is made available to one or more off-chain computing devices of the system.

In certain embodiments, the method may include enabling the first communication to be provided to the one or more off-chain computing devices in response to a remote procedure call. In certain embodiments, the method may include executing the one or more self-executed routines upon receipt of the first activity associated with the one or more self-executed routines. In certain embodiments, the method may include interrogating, after validating data associated with the first activity for inclusion on the distributed ledger of the distributed ledger architecture, a result object address associated with the first activity to obtain the first communication. In certain embodiments, the method may include receiving an acknowledgement from the one or more off-chain computing devices after the one or more off-chain computing devices obtain the first communication, accesses the first communication, or a combination thereof.

In certain embodiments, a non-transitory computer readable medium comprising instructions, which, when loaded and executed by a processor, cause the processor to be configured to facilitate a cryptographically-secured events-based communication protocol is provided. In certain embodiments, the processor may be configured to receive an activity for inclusion on a distributed ledger of a distributed ledger architecture of a system. In certain embodiments, the processor may be configured to validate, by utilizing a plurality of validators and based on the activity corresponding to one or more events subscribed to by one or more computing devices, the data associated with the activity for inclusion on the distributed ledger of the distributed ledger architecture without requiring a threshold level of consensus from the plurality of validators. In certain embodiments, the one or more events may correspond to the presence of a communication in the activity. In certain embodiments, the processor may be configured to submit the first activity for inclusion on the distributed ledger of the distributed ledger architecture so that the first communication is made available to one or more off-chain computing devices of the system. In certain embodiments, the processor may be configured to receive an acknowledgement from the one or more off-chain computing devices that the communication has been accessed by the one or more off-chain computing devices, obtained by the one or more off-chain computing devices, or a combination thereof. In certain embodiments, the processor may be further configured to analyze the activity to determine the presence of the communication in the activity. In certain embodiments, the processor may be further configured to sign the activity utilizing an encrypted key.

As shown in FIGS. 1-4, a system 100 for providing a cryptographically-secured events-based communication protocol is provided. Notably, the system 100 may be configured to support, but is not limited to supporting, cryptography systems and services, blockchain systems and services, distributed ledger systems and services, roofing systems and services, messaging systems and services, transaction processing systems and services, cloud computing systems and services, privacy systems and services, firewall systems and services, internet security systems and services, data analytics systems and services, data collation and processing systems and services, artificial intelligence services and systems, machine learning services and systems, neural network services, surveillance and monitoring systems and services, autonomous vehicle applications and services, text messaging services and applications, mobile applications and services, content delivery services, satellite services, telephone services, voice-over-internet protocol services (VOIP), software as a service (Saas) applications, platform as a service (PaaS) applications, gaming applications and services, social media applications and services, operations management applications and services, productivity applications and services, and/or any other computing applications and services. Notably, the system 100 may include a first user 101, who may utilize a first user device 102 to access data, content, and services, or to perform a variety of other tasks and functions. As an example, the first user 101 may utilize first user device 102 to transmit signals to access various online services and content, such as those available on an internet, on other devices, and/or on various computing systems. In certain embodiments, the first user 101 may utilize the first user device 102 to send or receive communications, such as messages. For example, the first user 101 may wish to send messages to another user (e.g., second user 121) and/or received messages from another user. As another example, the first user device 102 may be utilized to access an application, devices, and/or components of the system 100 that provide any or all of the operative functions of the system 100.

In certain embodiments, the first user 101 may be a person, a robot, a humanoid, a program, a computer, any type of user, or a combination thereof, that may be located in a particular environment. In certain embodiments, the first user 101 may be a person that is a worker of a roofing company, another type of worker, a homeowner, a guest of a homeowner, any other person, or a combination thereof. As an example, the first user 101 may be a person that may seek to communicate with other workers to collaborate on a work project (e.g., a roofing project), review work performed by other workers, provide alerts, or a combination thereof.

In certain embodiments, the first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102 and to interact with the system 100. In certain embodiments, the first user device 102 may be and/or may include a computer, any type of sensor, a laptop, a set-top-box, a tablet device, a phablet, a server, a mobile device, a smartphone, a smart watch, a voice-controlled-personal assistant, a physical security monitoring device (e.g., camera, glass-break detector, motion sensor, etc.), an internet of things device (IoT), appliances, a solar panel, a photovoltaic module, a communication device, a garage door opener, an autonomous vehicle, and/or any other type of computing device. Illustratively, the first user device 102 is shown as a computer in FIG. 1. In certain embodiments, the first user device 102 may be utilized by the first user 101 to control, access, and/or provide some or all of the operative functionality of the system 100. In certain embodiment, the system 100 may include a second user device 106. In certain embodiments, the second user device 106 may include a memory 107 that includes instructions, and a processor 108 that executes the instructions from the memory 107 to perform the various operations that are performed by the second user device 106. In certain embodiments, the processor 108 may be hardware, software, or a combination thereof. The second user device 102 may also include an interface 105 (e.g. screen, monitor, graphical user interface, etc.) that may enable the first user 101 to interact with various applications executing on the second user device 106 and to interact with the system 100.

In addition to using first user device 102 and/or the second user device 106, the first user 101 may also utilize and/or have access to any number of additional user devices. As with first user device 102 and/or second user device 106, the first user 101 may utilize the additional user devices to transmit signals to access various services and content and/or access functionality provided by a system (e.g., system 100). The additional user devices may include memories that include instructions, and processors that executes the instructions from the memories to perform the various operations that are performed by the additional user devices. In certain embodiments, the processors of the additional user devices may be hardware, software, or a combination thereof. The additional user devices may also include interfaces that may enable the first user 101 to interact with various applications executing on the additional user devices and to interact with the system 100. In certain embodiments, the first user device 102, the second user device 106, and/or the additional user devices may be and/or may include a computer, any type of sensor, a laptop, a set-top-box, a tablet device, a phablet, a server, a mobile device, a smartphone, a smart watch, an autonomous vehicle, and/or any other type of computing device, and/or any combination thereof. Sensors may include, but are not limited to, cameras, motion sensors, acoustic/audio sensors, pressure sensors, temperature sensors, rapid shutdown devices, light sensors, any type of sensors, or a combination thereof.

The first user device 102, the second user device 106, and/or additional user devices may belong to and/or form a communications network 110, which may be the first user's 101 network at a home 200. In certain embodiments, the communications network 110 may be a local, mesh, or other network that enables and/or facilitates various aspects of the functionality of the system 100. In certain embodiments, the communications network may be formed between the first user device 102, the second user device 106, and additional user devices through the use of any type of wireless or other protocol and/or technology. For example, user devices may communicate with one another in the communications network by utilizing any protocol and/or wireless technology, satellite, fiber, or any combination thereof. Notably, the communications network may be configured to communicatively link with and/or communicate with any other network of the system 100 (e.g., communications network 135) and/or outside the system 100.

In certain embodiments, the first user device 102, the second user device 106, and additional user devices belonging to the communications network 110 may share and exchange data with each other via the communications network 110. For example, the user devices may share information relating to the various components of the user devices, message with each other, information associated with images and/or content accessed and/or recorded by the first user 101 of the user devices, information identifying the locations of the user devices, information indicating the types of sensors that are contained in and/or on the user devices, information identifying the applications being utilized on the user devices, information identifying how the user devices are being utilized by a user, information identifying user profiles for users of the user devices, information identifying device profiles for the user devices, information identifying the number of devices in the communications network 101, information identifying devices being added to or removed from the communications network 110, any other information, or any combination thereof.

In certain embodiments, the system 100 may include another communications network 111, which may be configured to include a plurality of user devices as well. For example, the communications network may include a third user device 112 and a fourth user device 116, however, any number of user devices may be in the communications network 111. In certain embodiments, the third user device 112 may include a memory 113 that includes instructions, and a processor 114 that executes the instructions from the memory 113 to perform the various operations that are performed by the third user device 112. In certain embodiments, the processor 114 may be hardware, software, or a combination thereof. The third user device 112 may also include an interface 115 (e.g. screen, monitor, graphical user interface, etc.) that may enable the first user 101 to interact with various applications executing on the third user device 112 and to interact with the system 100. In certain embodiments, the fourth user device 116 may include a memory 117 that includes instructions, and a processor 118 that executes the instructions from the memory 117 to perform the various operations that are performed by the fourth user device 116. In certain embodiments, the processor 118 may be hardware, software, or a combination thereof. The fourth user device 116 may also include an interface 119 (e.g. screen, monitor, graphical user interface, etc.) that may enable the first user 101 to interact with various applications executing on the fourth user device 116 and to interact with the system 100. In certain embodiments, the communications network 111 and/or the communications network 110 may communicate with an edge device 120 to gain access to other networks, such as, but not limited to, the communications network 135.

In certain embodiments, the system 100 may include an edge device 120, which the first user 101 may access to gain access to the communications network 135, which may provide access to other networks, such as, but not limited to, communications networks 126, 127, which may be associated with a second user 121. In certain embodiments, the edge device 120 may be or may include, network servers, routers, gateways, switches, media distribution hubs, signal transfer points, service control points, service switching points, firewalls, routers, nodes, computers, proxy device, mobile devices, or any other suitable computing device, or any combination thereof. In certain embodiments, the edge device 120 may connect with any of the devices and/or componentry of the communications network 135. In certain embodiments, the edge device 120 may be provided by and/or be under the control of a service provider, such as an internet, television, telephone, and/or other service provider of the first user 101. In certain embodiments, the system 100 may operate without the edge device 120 and the first user device 102 and/or second user device 106 may operate as an edge device.

In addition to the first user 101, the system 100 may also include a second user 121. The second user 121 may be similar to the first user 101, but may be associated with a different home 210. In certain embodiments, the second user 121 may utilize a fifth user device 122, which may be communicatively linked to a communications network 126. In certain embodiments, the fifth user device 122 may be utilized by the second user 121 to transmit signals to request various types of content, services, and data provided by and/or accessible by communications network 135 or any other network in the system 100. In further embodiments, the second user 121 may be a robot, a computer, a vehicle (e.g. semi or fully-automated vehicle), a humanoid, an animal, any type of user, or any combination thereof. The fifth user device 122 may include a memory 123 that includes instructions, and a processor 124 that executes the instructions from the memory 123 to perform the various operations that are performed by the second user device 122. In certain embodiments, the processor 124 may be hardware, software, or a combination thereof. The fifth user device 122 may also include an interface 125 (e.g. screen, monitor, graphical user interface, etc.) that may enable the first user 101 to interact with various applications executing on the fifth user device 122 and, in certain embodiments, to interact with the system 100. In certain embodiments, the fifth user device 122 may be a computer, a laptop, a set-top-box, a tablet device, a phablet, a server, a mobile device, a smartphone, a smart watch, an autonomous vehicle, and/or any other type of computing device. Illustratively, the fifth user device 122 is shown as a mobile device in FIGS. 1 and 2. In certain embodiments, the fifth user device 122 may also include sensors, such as, but are not limited to, cameras, audio sensors, motion sensors, pressure sensors, temperature sensors, light sensors, humidity sensors, any type of sensors, or a combination thereof. In certain embodiments, the second user 121 may also utilize a sixth user device 128, which may include a memory 129, processor 130, and interface 131, which may be similar to the other user devices. In certain embodiments, the sixth user device 128 may be communicatively linked with a communications network 127 and/or other network of the system 100.

In certain embodiments, the second user's 121 home network(s) may be communications network 126, communications network 127, or a combination thereof. In certain embodiments, the system 100 may include edge device 132, which may be utilized by the communications network 126 and/or communications network 127 to communicate with other networks, such as communications network 135, and/or devices, programs, and/or systems that are external to the communications networks 126, 127, such as communications networks 111, 110.

In certain embodiments, the user devices described herein may have any number of software functions, applications and/or application services stored and/or accessible thereon. For example, the user devices may include applications for controlling and/or accessing the operative features and functionality of the system 100, applications for controlling and/or accessing any device of the system 100, blockchain and/or distributed ledger applications, roofing-related applications, messaging applications, interactive social media applications, biometric applications, cloud-based applications, VOIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications may support the functionality provided by the system 100 and methods described in the present disclosure. In certain embodiments, the software applications and services may include one or more graphical user interfaces so as to enable the first and/or second users 101, 121 to readily interact with the software applications. The software applications and services may also be utilized by the first and/or second users 101, 121 to interact with any device in the system 100, any network in the system 100, or any combination thereof. In certain embodiments, user devices may include associated telephone numbers, device identities, network identifiers (e.g., IP addresses, etc.), and/or any other identifiers to uniquely identify the user devices.

The system 100 may also include a communications network 135. The communications network 135 may be under the control of a service provider, business, user, or a combination thereof, and may include resources (e.g., data, documents, computing resources, applications, and/or any other resources) that may be accessed by devices, programs, and/or systems of the system 100. The communications network 135 of the system 100 may be configured to link any number of the devices in the system 100 to one another. For example, the communications network 135 may be utilized by the third user device 112 of communications network 111 to connect with other devices within or outside communications network 135. Additionally, the communications network 135 may be configured to transmit, generate, and receive any information and data traversing the system 100. In certain embodiments, the communications network 135 may include any number of servers, databases, or other componentry. The communications network 135 may also include and be connected to a neural network, a mesh network, a local network, a cloud-computing network, an IMS network, a VoIP network, a security network, a VOLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 140, 145, and 150 are shown as being included within communications network 135. In certain embodiments, the communications network 135 may be part of a single autonomous system that is located in a particular geographic region, or be part of multiple autonomous systems that span several geographic regions.

In certain embodiments, the communications network 135 may be configured to transmit or receive communications from the devices of the communications networks 111, 110, 126, 127. For example, in certain embodiments, the communications network 135 may be configured to receive a communication (e.g., a message, signal, sensor data, information, etc.) from communications network 126 that may be intended for first user device 102 of the communications network 110, communications network 111, any other device and/or network, or a combination thereof. In certain embodiments, communications network 135 may maintain and store a distributed ledger of a blockchain of the system 100. In certain embodiments, the communications network 135 may process activities, (e.g., transactions) intended to be included on the distributed ledger. In certain embodiments, the communications network 135 may validate or reject received activities (e.g., transactions). In certain embodiments, the communications network 135 may submit validated activities and associated data for inclusion on the distributed ledger so that the transactions and/or content contained therein may be accessed by devices, programs, and/or systems subscribing to events associated with the transactions.

Notably, the functionality of the system 100 may be supported and executed by using any combination of the servers 140, 145, 150, and 160. The servers 140, 145, and 150 may reside in communications network 135, however, in certain embodiments, the servers 140, 145, 150 may reside outside communications network 135. The servers 140, 145, and 150 may provide and serve as a server service that performs the various operations and functions provided by the system 100. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145, 150 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or may be connected to a processor and memory to perform the various operations associated with the database 155. In certain embodiments, the database 155 may be connected to the servers 140, 145, 150, 160, the first user device 102, a second user device 106, a third user device 112, a fourth user device 116, a fifth user device 122, a sixth user device 128, the communications network 110, the communications network 111, the communications network 126, the communications network 127, the communications network 135, a server 140, a server 145, a server 150, a server 160, edge devices 120, 132, a database 155, the client service/accumulator 308, the validators 310*a-n*, the full nodes 312*a-n*, the additional user devices, any devices in the system 100, any process of the system 100, any program of the system 100, any other device, any network, or any combination thereof.

The database 155 may also store information and metadata obtained from the system 100, store metadata and other information associated with the first and second users 101, 121, store transactions received by the system 100, store communications (e.g., messages) associated with activities (e.g., transactions) of the system 100, store information identifying rejected activities, store validations of activities, store acknowledgements relating to access of communications (e.g., messages and/or other content) associated with activities, store the distributed ledger of the system 100, store information relating to subscription of events by computing devices of the system 100, store data shared by devices in the networks, store configuration information for the networks and/or devices of the system 100, store user profiles associated with the first and second users 101, 121, store device profiles associated with any device in the system 100, store communications traversing the system 100, store user preferences, store information associated with any device or signal in the system 100, store information relating to patterns of usage relating to the user devices, store any information obtained from any of the networks in the system 100, store historical data associated with the first and second users 101, 121, store device characteristics, store information relating to any devices associated with the first and second users 101, 121, store information associated with the communications network 135, store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, subscribing and/or facilitating subscription to an event associated with a self-executed routine (e.g., a smart contract) of a distributed ledger architecture of a system including a distributed ledger, such as by establishing an event handler connection; processing activities (e.g., transactions) arriving at a system for inclusion onto the distributed ledger of the distributed ledger architecture; determining whether an activity corresponds to a subscribed event based on execution of the self-executed routine; validating activities using a plurality of validators requiring a threshold level of consensus if the activities does not correspond to a subscribed event; validating activities using the plurality of validators not requiring a threshold level of consensus if the activity does correspond to the subscribed event; rejection activities that do not have a threshold level of consensus, submitting validated data associated with activities for inclusion on the distributed ledger, enabling subscribed to events (e.g., messages associated with transactions) to be accessed by computing devices (e.g., off-chain devices) subscribing to the events; receiving acknowledgements from the computing devices that access the messages (or other content) associated with activities; and performing any other suitable operations conducted in the system 100 or otherwise. In certain embodiments, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Figure 2:
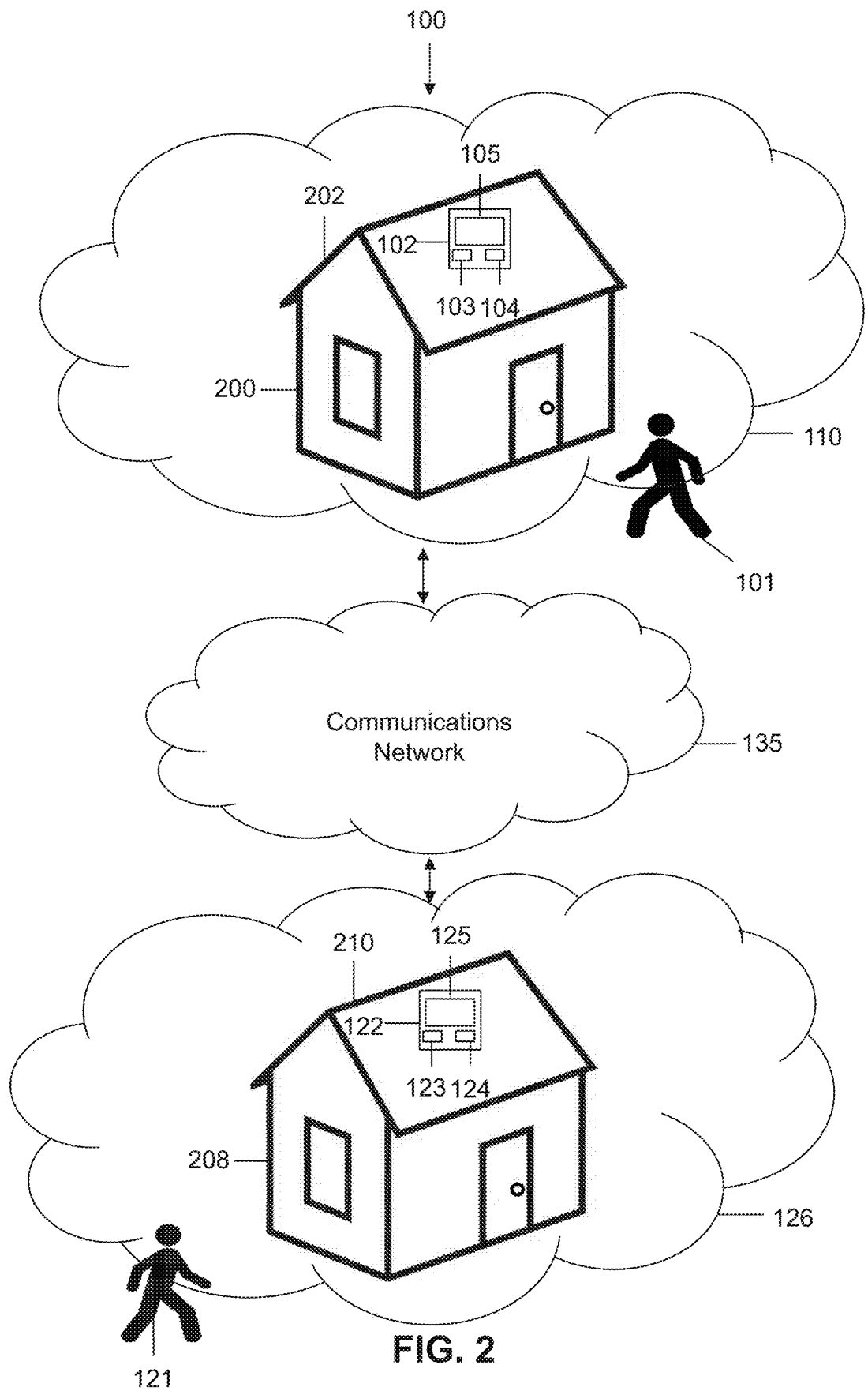
FIG. 2 illustrates an exemplary system for providing a cryptographically-secured events-based communication protocol via roofing mesh networks according to embodiments of the present disclosure.

Referring now also to FIG. 2, the system 100 may be incorporated into a user's home, multiple users' homes, across multiple users' homes, or a combination thereof. In certain embodiments, the devices of the system 100 may be communicatively linked with each other to form a mesh network to facilitate the exchange of data between and/or among households, buildings, and/or other structures. For example, as shown in FIG. 2, the first user 101 may have a home 200, which may include a roof 202 installed on a roof deck of the home 200. In certain embodiments, the first user device 102, second user device 106, third user device 112, fourth user device 116, other device, or a combination thereof, may be present on the home 200, on the roof 202, in proximity to the roof 202, in a vicinity of the home 200 and/or roof 202, or a combination thereof. In certain embodiments, any number of networks may be formed using the user devices, such as, but not limited to communications networks 110, 111. In certain embodiments, the user devices may communicate to other networks, such as communications networks 135, 126, 127 by communicating activities (e.g., transactions), communications (e.g., messages), signals, or a combination thereof, to an edge device 120, which may communicate with such other networks.

Also, as shown in FIG. 2, the second user 121 may also have a home 208, which may also include a roof 210 installed on a roof deck of the home 208. In certain embodiments, the fifth user device 122, the sixth user device 128, other user devices, or a combination thereof, may be present on the home 208, on the roof 202, in proximity to the roof 202, in a vicinity of the home 202 and/or roof 202, or a combination thereof. In certain embodiments, any number of networks may be formed using the user devices of the home 208, and the user devices may utilize such networks to communicate with other networks, such as communications networks 135, 110, 111. For example, activities (e.g., transactions), communications (e.g., messages), signals, or a combination thereof, may be sent or received by the user devices of the home 208 to or by the user devices of the home 200. In certain embodiments, for example, the first user 101 may wish to send a communication (e.g., a message) to the second user 121 and the communication may be sent to the distributed ledger architecture as an activity (e.g., a transaction) or within an activity to be validated by the validators of the blockchain for including on a distributed ledger of the distributed ledger architecture. If the communication is validated and included on the distributed ledger architecture, the user devices of the second user 121 may access the communication from the distributed ledger and display or otherwise interact with the communication. Similarly, the second user 121 may also send a communication via an activity to be validated via validators of the blockchain for ultimate receipt by the user devices of the first user 101.

Figure 3:
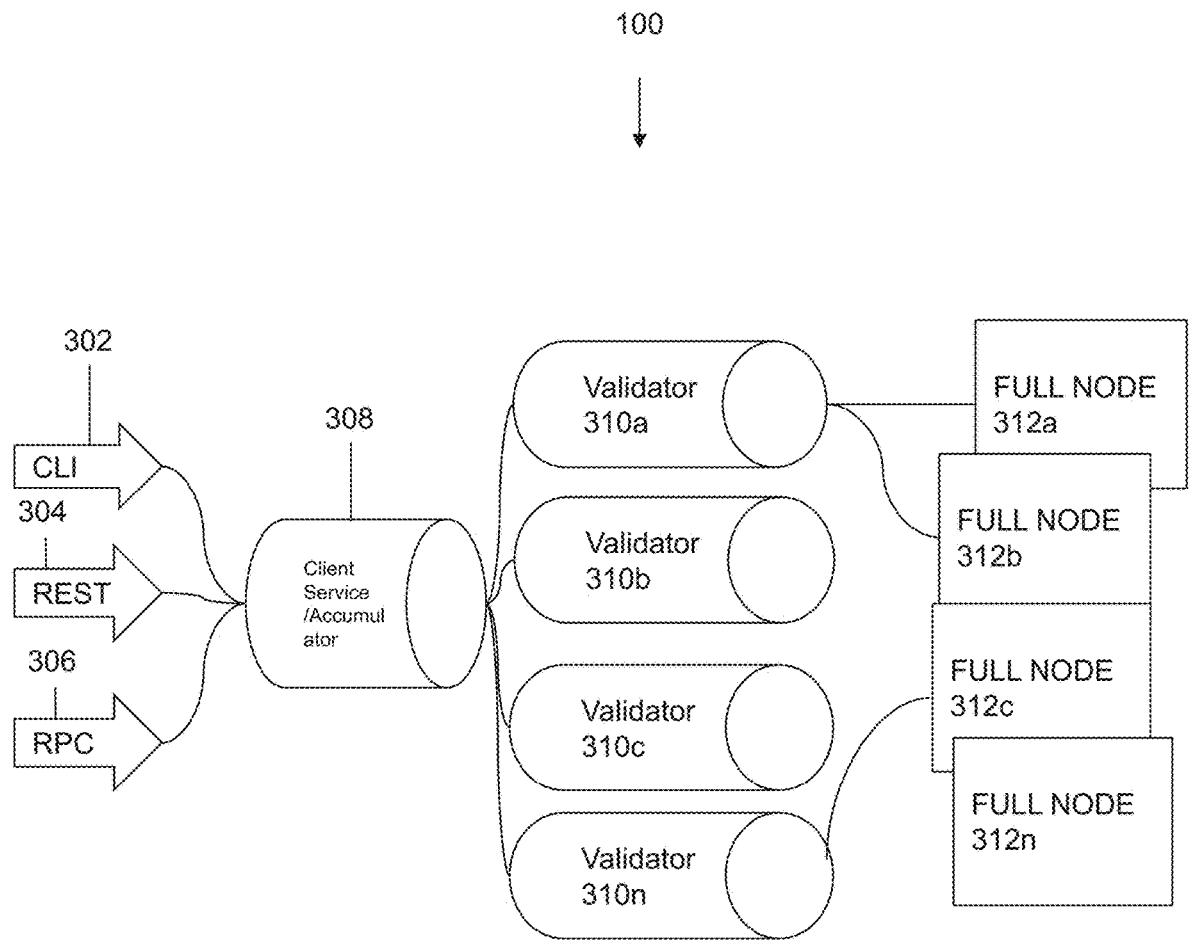
FIG. 3 illustrates componentry of an exemplary system for providing a cryptographically-secured events-based communication protocol according to embodiments of the present disclosure.

Referring now also to FIG. 3, further details relating to the distributed ledger architecture (e.g., blockchain) functionality supported by the system 100 is shown. Any number of techniques, protocols, architectural constraints, or a combination thereof, may be utilized to provide activities (e.g., transactions) to the system 100, request services from the system 100, or a combination thereof. For example, the system 100 may be configured to support command line interface (CLI) 302, representational state transfer (REST) 304, remote procedure protocol (RPC), any other technologies, or a combination thereof. CLI 302, for example, may be a command line program that is configured to accept text input to execute various functions, such as transmitting messages, content, commands, etc. Such inputs may be provided by the devices of the system 100, for example. Similarly, REST 302 may be utilized to serve as an interface to exchange information, messages, data, commands, and the like with other devices. RPC 306 may be utilized as a communication protocol that devices of the system 100 may utilized to request a service provided by another system, program, device, or a combination thereof, that is provided on a network separate from the requesting device's network. In certain embodiments, for example, the computing devices 415, 417 (discussed in further detail below) may issues a procedure call to request a service from the blockchain of the system (e.g., transmission of messages, content, etc.) and the blockchain system may respond by processing activities and providing communications, messages, content, etc. that may be delivered to or access by the requesting devices (e.g., computing devices 415, 417 or full nodes 312a-n).

In certain embodiments, as shown in FIG. 3, requests for services from various devices of the system 100 may accumulated and/or aggregated by client service/accumulator 308, which may comprise hardware, software, or a combination of hardware and software. In certain embodiments, activities requested by various devices or sent by various devices may be accumulated by the client service/accumulator 308. Once the activities are accumulated or at any desired time, the activities may be analyzed by componentry of the system 100 to determine whether the activities are associated with subscribed-to events or not. In certain embodiments, for example, if the activity is associated with a subscribed-to event (e.g., an event corresponding to a message), the activity may be validated by any one or more of the validators 310a-n without requiring consensus for inclusion on the distributed ledger of the distributed ledger architecture. If, however, the activity is not associated with a subscribed-to event, the activity may need to be validated by a threshold number of validators 310a-n before validation and inclusion on the distributed ledger. In certain embodiments, the validators 310a-n may be separate devices, separate programs, separate instances of programs, or a combination thereof. In certain embodiments, each validator 310a-n may run its own instance of distributed ledger (e.g., blockchain) software on a separate machine, a shared cluster of machines, or on the same machine. In certain embodiments, the validators 310a-n may be provided a reward for conducting validation and may be provided a reward in the form of the token, asset, or currency utilized by the blockchain system (e.g., Sui coins if using a Sui blockchain implementation). In certain embodiments, a dynamically changing amount of gas (e.g., based on network conditions, high transaction volume, etc.) or set amount of gas may be utilized to pay for all transactions occurring in the system 100.

In certain embodiments, the system 100 may include a plurality of full nodes 312a-n, which may be utilized to perform a variety of functions. In certain embodiments, the full nodes 312a-n may be hardware, software, or a combination of hardware and software. In certain embodiments, the full nodes 312a-n may be communicatively linked with devices, such as computing devices 415, 420, and/or accessory devices 417, 422 and also to the blockchain and/or validators 310a-n. In certain embodiments, the full nodes 312a-n may be read-only and may be configured to obtain communications or other content corresponding to subscribed-to events from the distributed ledger of the blockchain (i.e., validated activities and/or associated data stored on the distributed ledger), and then provide such communications or other content to the computing devices 415, 420 and/or accessory devices 417, 422, for consumption. In certain embodiments, the data may include the communications (e.g., messages).

In certain embodiments, the full nodes 312a-n may be configured to track and verify the state of the distributed ledger architecture of the system 100, both independently and locally. In certain embodiment, the full nodes 312a-n may be configured to relay read requests from clients (e.g., the computing devices 415, 420, accessory devices 417, 422, and/or other devices of the system 100) to the system 100. In certain embodiments, the full nodes 312a-n may be configured to conduct local application testing against verified data, subscribe to events, converse over web sockets, and incorporate a web front end. In certain embodiments, the full nodes 312a-n may be configured to support an event subscription model for the system 100.

Figure 4:
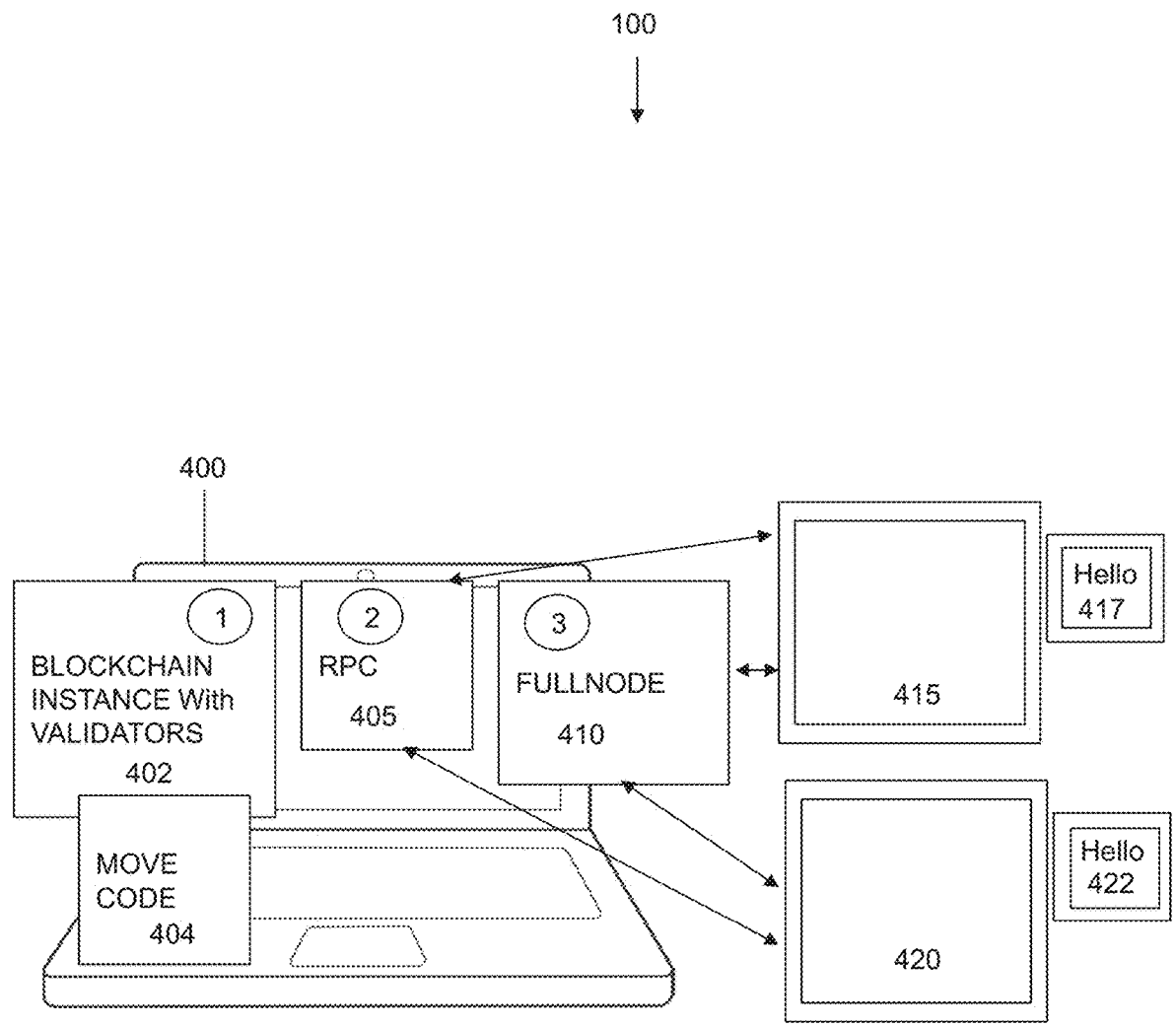
FIG. 4 illustrates componentry of an exemplary system for providing a cryptographically-secured events-based communication protocol according to embodiments of the present disclosure.

Referring now also to FIG. 4, further componentry and functionality of the system 100 is shown. In certain embodiments, the system 100 may include a computing device 400, which may be configured to include any number of blockchain or distributed ledger architecture instances with validators 402, smart contract code (e.g., Move code) 404, RPC functionality 405, any number of full nodes 410, or a combination thereof. The system 100 may also include computing device 415, computing device 420, accessory device 417, accessory device 422, or a combination thereof, which may be separate from computing device 400. In certain embodiments, the full node 410 may be utilized to subscribe to events, which may have communications and/or content (e.g., messages) associated therewith to be provided to devices in an off chain manner. For example, while the full node 410 may be connected to the distributed ledger architecture, the computing devices 415, 420 and/or accessory device 417, 422 may be off chain and may not be directly connected to the distributed ledger architecture. When activities are validated by the validator(s) 402 and have the subscribed-to event (e.g., a message), such as in response to a RPC call 405, the information (e.g. message) may be included on the distributed ledger architecture and retrieved and/or accessed by the full node 410 and delivered to the computing devices 415, 420, which may then provide the information (e.g., message) for display on the interfaces of the accessory devices 417, 422. In certain embodiments, in addition to providing communications, the full node 410 (or validators 402) may also provide and/or determine the amount of time it took to get the consensus process to approve the transaction (e.g., message) and the time may be displayed with the message. In certain embodiments, the computing devices 415, 420, and/or accessory devices 417, 422 may send back activities including communications to the full node, which may then forward the activities to the distributed ledger architecture for processing and validation. Such activities may be new communications in response to the communications received, acknowledgements of receipt of the communications, or a combination thereof.

Although FIGS. 1-4 illustrates specific example configurations of the various components of the system 100, the system 100 may include any configuration of the components, which may include using a greater or lesser number of the components. For example, the system 100 is illustratively shown as including a first user device 102, a second user device 106, a third user device 112, a fourth user device 116, a fifth user device 122, a sixth user device 128, a communications network 110, a communications network 111, a communications network 126, a communications network 127, a communications network 135, a server 140, a server 145, a server 150, a server 160, edge devices 120, 132, a database 155, a client service/accumulator 308, validators 310a-n, and full nodes 312a-n. However, the system 100 may include multiple first user devices 102, multiple first user devices 102, multiple second user devices 106, multiple third user devices 112, multiple fourth user devices 116, multiple fifth user devices 122, multiple sixth user devices 128, multiple communications networks 110, multiple communications networks 111, multiple communications networks 126, multiple communications networks 127, multiple communications networks 135, multiple servers 140, multiple servers 145, multiple servers 150, multiple servers 160, multiple edge devices 120, 132, multiple databases 155, multiple client service/accumulators 308, any number of validators 310a-n, multiple full nodes 312a-n, and/or any number of any of the other components inside or outside the system 100. Furthermore, in certain embodiments, substantial portions of the functionality and operations of the system 100 may be performed by other networks and systems that may be connected to system 100.

Figure 5:
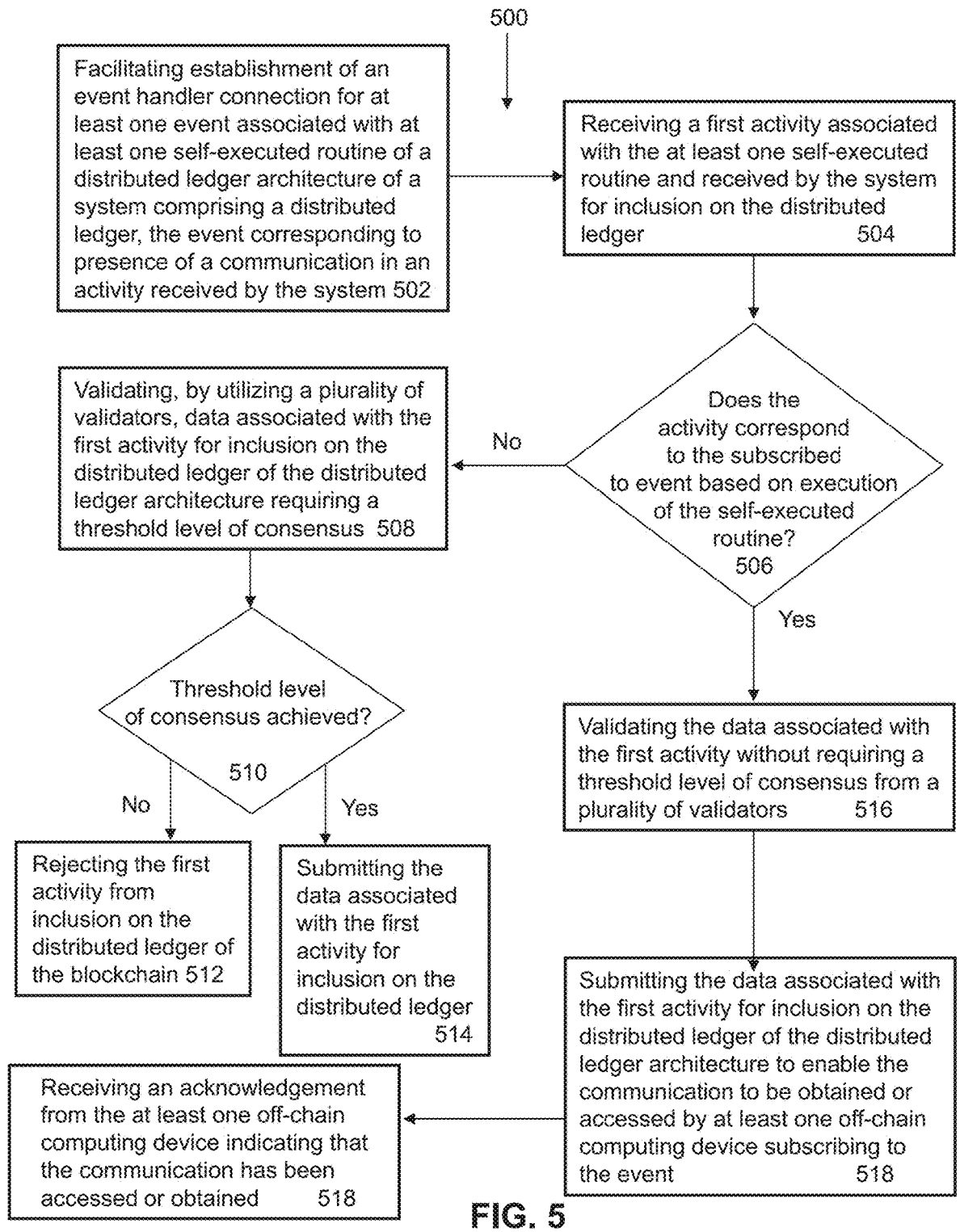
FIG. 5 illustrates an exemplary method for providing a cryptographically-secured events-based communication protocol according to embodiments of the present disclosure.

Referring now also to FIG. 5, FIG. 5 illustrates an exemplary method 500 for providing a cryptographically-secured events-based communication protocol according to embodiments of the present disclosure. In certain embodiments, the method of FIG. 5 can be implemented in the system of FIGS. 1-4 and/or any of the other systems, devices, and/or componentry illustrated in the Figures. In certain embodiments, the method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 may be performed at least in part by one or more processing devices of the system 100. Although shown in a particular sequence or order, unless otherwise specified, the order of the steps in the method 500 may be modified and/or changed depending on implementation and objectives. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Generally, the method 500 may include a steps for providing a cryptographically-secured events-based communication protocol system, such as system 100. Notably, the method 500 may include steps for enabling computing devices and systems to subscribe to events associated with self-executed routines (e.g., smart contracts) of a distributed ledger architecture of a system (e.g., system 100). For example, the events may be emitted by a self-execute routine upon execution of an activity received by the system 100. In certain embodiments, for example, the subscribed-to event may be a communication (e.g., message) that may be sent from one device and may be intended to be received by one or more recipient devices. The method 500 may include processing activities associated with the self-executed routine and determining if the activities corresponds to the subscribed-to event based on execution of the self-executed routine. The method 500 may also include validating the activities and/or associated data using any number of validators. In certain embodiments, the validation may require a threshold level of consensus (e.g., if the activity is not associated with a subscribed-to event), however, in certain embodiments, the validation may not require a threshold level of consensus, such as if the activity is associated with a subscribed-to event. Once the activity and/or associated data is validated, the method 500 may include submitting the data associated with the activity for inclusion on the distributed ledger to enable a device subscribing to an event (e.g., associated with the transaction) to access content associated with the event (e.g., a message)

At step 502, the method 500 may include facilitating subscription to an event associated with a self-executed routine of a distributed ledger architecture of a system (e.g., system 100) including a distributed ledger, such as by establishing an event handler connection for subscription of the event. In certain embodiments, the event may correlate with anything of interest to a user, a system, a program, a device, or a combination thereof. For example, the event may be a specific type of output generated by a self-executed routine (e.g., a smart contract, such as a smart contract based on Ethereum protocol) based on processing of activities received by the system 100. In certain embodiments, the event may be a presence of a communication (e.g., a message) in an activity, the occurrence of a particular action, output and/or receipt of a specific type of content relating to an activity, presence of specific information in an activity or output from processing of the activity, a specific type of output generated based on execution of the self-executed routine, or a combination thereof. In certain embodiments, devices, programs, systems, or a combination thereof, may subscribe to an event. For example, in certain embodiments, the full nodes 310*a-n*, the computing devices 415, 420, and/or the accessory devices 417, 422 may subscribe to the event. In certain embodiments, for example, a self-executed routine may be assigned to endpoints of the computing devices 415, 420. In certain embodiments, for example, the self-executed routine may execute when activities enter the system 100 and may allow certain types of content (e.g., a message) to be displayed on the screen of the computing devices 415, 420 and/or accessory devices 417, 422. In certain embodiments, the event handler connection for subscription of the event can be established between, among, and/or by the full nodes 310*a-n*, the computing devices 415, 420, and/or accessory devices 417, 422 with the distributed ledger and/or self-executed routine. In certain embodiments, the event handler connection can facilitate registration of an event handler when the self-executed routine executes after one or more events take place. In certain embodiments, the event handler connection can facilitate event listening as well. For example, when supporting event listening, an event listener can listen to one or more events via the event handle/listener connection and can then trigger execution of code to handle (e.g., process) the event(s). In certain embodiments, the facilitating of the subscription and/or subscription of an event may be performed and/or facilitated by utilizing the server 140, the server 145, the server 150, the server 160, the communications network 135, the client service/accumulator 308, any component of the system 100, any combination thereof, or by utilizing any other appropriate program, network, system, or device.

At step 504, the method 500 may include receiving a first activity at the system 100, which may be included on the distributed ledger of the distributed ledger architecture of the system 100 if the first activity is ultimately validated by the plurality of validators 310*a-n*. In certain embodiments, the first activity may be associated with the self-executed routine in that the first activity may trigger the self-executed routine to execute and output a result based on the execution of the self-executed routine. In certain embodiments, the first activity may be received at the system 100 based on and/or in response to remote procedure calls, such as by devices of the system 100. In certain embodiments, the first activity may be analyzed and/or processed. In certain embodiments, the receiving the first activity and/or the processing may be performed and/or facilitated by utilizing the server 140, the server 145, the server 150, the server 160, the communications network 135, any component of the system 100, any combination thereof, or by utilizing any other appropriate program, network, system, or device.

At step 506, the method 500 may include determining if the first activity corresponds to the subscribed-to event based on execution of the self-executed routine. In certain embodiments, the determining may be performed and/or facilitated by utilizing the server 140, the server 145, the server 150, the server 160, the communications network 135, any component of the system 100, any combination thereof, or by utilizing any other appropriate program, network, system, or device. If, for example, the activity does not correspond to the subscribed-to event (e.g., does not contain a communication (e.g., a message) assuming the subscribed-to event is a communication), the method 500 may proceed to step 508. At step 508, the method 500 may include validating the first activity and/or associated data for inclusion on the distributed ledger of the distributed ledger architecture requiring a threshold level of consensus among a plurality of validators (e.g., validators 310*a-n*). For example, the threshold level of consensus may be a certain percentage of validators validating the activity (e.g., 75% or other percentage). In certain embodiments, the validating may be performed and/or facilitated by utilizing the server 140, the server 145, the server 150, the server 160, the communications network 135, the validators 310*a-n*, any component of the system 100, any combination thereof, or by utilizing any other appropriate program, network, system, or device.

At step 510, the method 500 may include determining if the threshold level of consensus required was achieved. In certain embodiments, the determining of achievement of the threshold level of consensus may be performed and/or facilitated by utilizing the server 140, the server 145, the server 150, the server 160, the communications network 135, any component of the system 100, any combination thereof, or by utilizing any other appropriate program, network, system, or device. If, at step 510, the threshold level of consensus has not been achieved, the method 500 may proceed to step 512. A step 512, the method 500 may include rejecting the first activity and/or associated data from inclusion on the distributed ledger of the distributed ledger architecture. In certain embodiments, the rejecting may be performed and/or facilitated by utilizing the server 140, the server 145, the server 150, the server 160, the communications network 135, any component of the system 100, any combination thereof, or by utilizing any other appropriate program, network, system, or device. If, however, at step 510, the method 500 includes determining that the threshold level of consensus has been achieved, the method 500 may proceed to step 514. At step 514, the method 500 may include submitting the first activity and/or data associated therewith for inclusion on the distributed ledger. In certain embodiments, submission of the first activity for inclusion on the distributed ledger may be performed and/or facilitated by utilizing the server 140, the server 145, the server 150, the server 160, the communications network 135, any component of the system 100, any combination thereof, or by utilizing any other appropriate program, network, system, or device. The method 500 may repeat as additional activities are received by the system 100.

At step 506, if the activity is determined to correspond to the subscribed-to event based on execution of the self-executed routine (or other routine that may not be self-executing), the method 500 may proceed to step 516. At step 516, the method 500 may include validating the first activity without requiring a threshold level of consensus from a plurality of validators. For example, in certain embodiments, if at least one validator validates the first activity, the first activity and associated data may be validated. In certain embodiments, at step 516, the method 500 may include automatically validating the first activity and/or associated data by virtue of the activity corresponding to the subscribed-to event. In certain embodiments, the validating may be performed and/or facilitated by utilizing the server 140, the server 145, the server 150, the server 160, the communications network 135, any component of the system 100, any combination thereof, or by utilizing any other appropriate program, network, system, or device.

At step 518, the method 500 may include submitting data associated with the first activity for inclusion on the distributed leger of the distributed ledger architecture to enable the communication (e.g., a message) to be obtained and/or accessed by at least one computing device subscribing to the event (i.e., the message in this scenario). In certain embodiments, for example, a full node 312*a* may obtain the communication from the distributed ledger and provide the communication to at least one computing device (e.g., an off-chain computing device) subscribing to the event, which may then provide the communication for display on an accessory device (e.g. another off-chain computing device). In certain embodiments, the submitting may be performed and/or facilitated by utilizing the server 140, the server 145, the server 150, the server 160, the communications network 135, any component of the system 100, any combination thereof, or by utilizing any other appropriate program, network, system, or device. At step 518, the method 500 may include receiving an acknowledgement from the at least one computing device indicating that the communication has been received, accessed, and/or obtained from the distributed ledger. For example, the acknowledgement may be transmitted by the full node(s) 312*-n*, the computing devices 415, 420, and/or the accessory devices 417, 422. In certain embodiments, the receiving of the acknowledgement may be performed and/or facilitated by utilizing the server 140, the server 145, the server 150, the server 160, the communications network 135, any component of the system 100, any combination thereof, or by utilizing any other appropriate program, network, system, or device.

Notably, in certain embodiments, the method 500 may be repeated as desired, which may be on a continuous basis, periodic basis, or at designated times. Notably, the method 500 may incorporate any of the other functionality as described herein and may be adapted to support the functionality of the system 100. In certain embodiments, functionality of the method 500 may be combined with other methods and functionality described in the present disclosure. In certain embodiments, certain steps of the method 500 may be replaced with other functionality of the present disclosure and the sequence of steps may be adjusted as desired.

Figure 6:
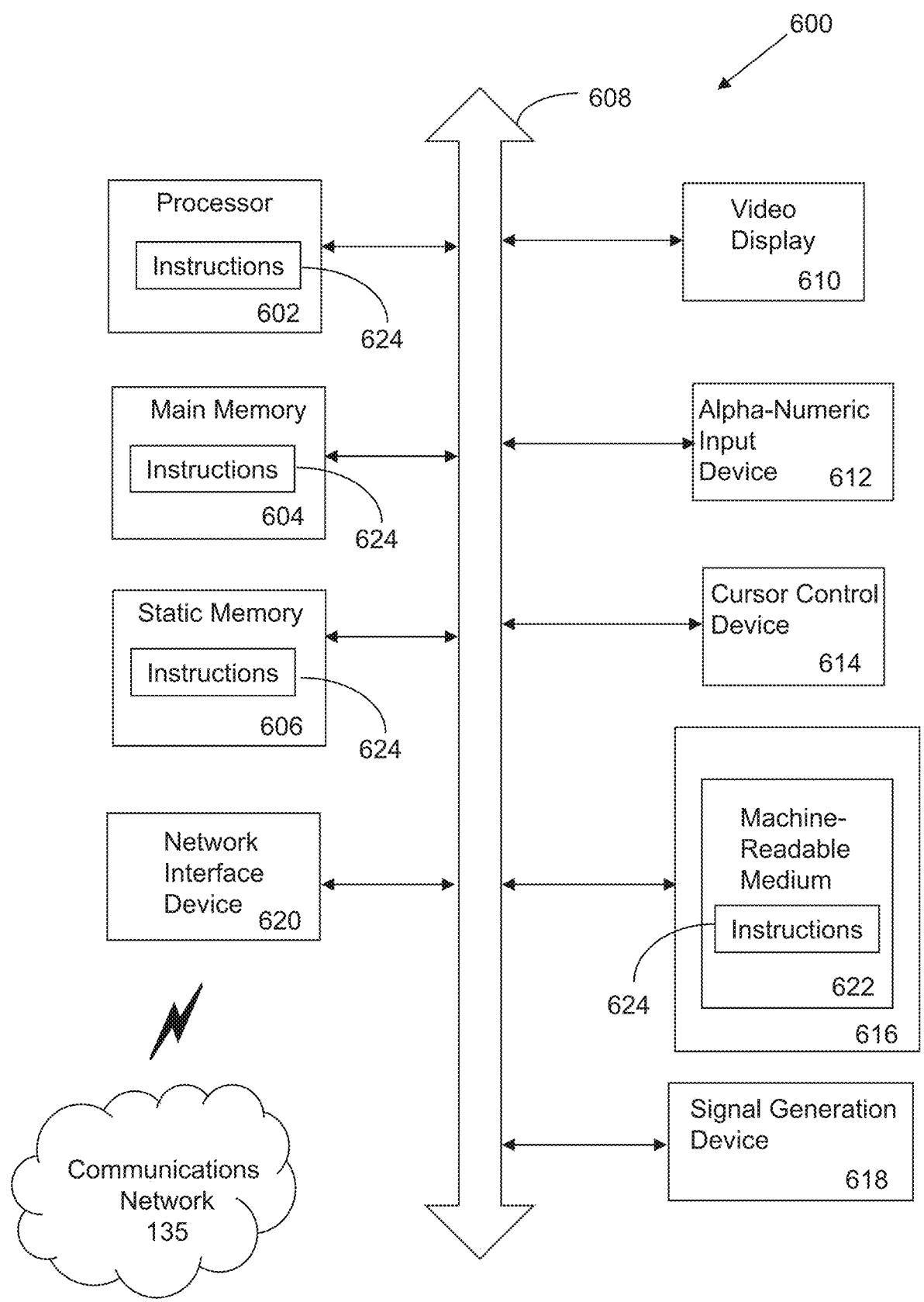
FIG. 6 illustrates a schematic diagram of a machine in the form of a computer system within which a set of instructions, when executed, may cause the machine to provide a cryptographically-secured events-based communication protocol according to embodiments of the present disclosure.

Referring now also to FIG. 6, at least a portion of the methodologies and techniques described with respect to the exemplary embodiments of the system 100 and/or method 500 can incorporate a machine, such as, but not limited to, computer system 600, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100. As another example, in certain embodiments, the computer system 600 may assist in facilitating subscriptions to events associated with self-executed routines (e.g., smart contracts); determining the presence of communications or other events of interest in activities received by the system 100; processing activities received by the system 100; determining whether the activities received by the system correspond to events based on execution of the routines of the system 100; validating the activities and/or associated data for inclusion on a distributed ledger of a distributed ledger architecture of the system; validating activities and/or associated data requiring a threshold level of consensus; validating activities and/or associated data not requiring a threshold level of consensus (e.g., if the activity is associated with a subscribed-to event; submitting data associated with activities for inclusion onto the distributed ledger after validation of the activities and/or associated data; rejecting activities and/or associated data for inclusion on the distributed ledger (e.g., if the activity fails validation); receiving acknowledgements from devices accessing or obtaining communications from activities; and/or performing any other operations of the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 106, the third user device 112, the fourth user device 116, the fifth user device 122, the sixth user device 128, communications network 110, the communications network 111, the communications network 126, the communications network 127, the communications network 135, the server 140, the server 145, the server 150, the server 160, edge devices 120, 132, the database 155, the client service/accumulator 308, the validators 310a-n, the full nodes 312a-n, any other system, program, and/or device, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610, which may be, but is not limited to, a liquid crystal display (LCD), a flat panel, a solid-state display, or a cathode ray tube (CRT). The computer system 600 may include an input device 612, such as, but not limited to, a keyboard, a cursor control device 614, such as, but not limited to, a mouse, a disk drive unit 616, a signal generation device 618, such as, but not limited to, a speaker or remote control, and a network interface device 620.

The disk drive unit 616 may include a machine-readable medium 622 on which is stored one or more sets of instructions 624, such as, but not limited to, software embodying any one or more of the methodologies or functions described herein, including those methods illustrated above. The instructions 624 may also reside, completely or at least partially, within the main memory 604, the static memory 606, or within the processor 602, or a combination thereof, during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 622 containing instructions 624 so that a device connected to the communications network 135, another network, or a combination thereof, can send or receive voice, video or data, and communicate over the communications network 135, another network, or a combination thereof, using the instructions. The instructions 624 may further be transmitted or received over the communications network 135, another network, or a combination thereof, via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure is not limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A system, comprising:
   a memory that stores instructions; and
   a processor that executes the instructions to configure the processor to:
   facilitate establishment of an event handler connection for at least one event associated with at least one self-executed routine of a distributed ledger architecture, comprising a distributed ledger, wherein the at least one event corresponds to presence of a communication in an activity associated with the system;
   receive a first activity associated with the at least one self-executed routine, wherein the first activity is received by the system for inclusion of data associated with the first activity on the distributed ledger;
   determine that the first activity corresponds to the at least one event and comprises a first communication;
   validate, by utilizing a plurality of validators and based on the first activity being determined to correspond to the at least one event, the data associated with the first activity for inclusion on the distributed ledger of the distributed ledger architecture without requiring a threshold level of consensus from the plurality of validators; and
   submit the data associated with the first activity for inclusion on the distributed ledger of the distributed ledger architecture so that the first communication is provided via the distributed ledger of the distributed ledger architecture to at least one off-chain computing device for display.

2. The system of claim 1, wherein the processor is further configured to independently monitor a state of the distributed ledger architecture of the system, and wherein the processor is further configured to verify the state of the distributed ledger architecture of the system based on the monitoring.

3. The system of claim 1, wherein the processor is further configured to determine that the first activity does not correspond to the at least one event if the first activity does not include the communication.

4. The system of claim 3, wherein the processor is further configured to reject the data associated with the first activity for inclusion on the distributed ledger if the first activity does not correspond to at least one the event.

5. The system of claim 3, wherein the processor is further configured to validate, if the first activity does not include the communication, the first activity requiring the threshold level of consensus from the plurality of validators.

6. The system of claim 5, wherein the processor is further configured to submit the data associated with the first activity for inclusion on the distributed ledger after validating the first activity requiring the threshold level of consensus from the plurality of validators.

7. The system of claim 1, wherein the processor is further configured to facilitate assignment of the at least one self-executed routine to the at least one off-chain computing device, and wherein the processor is further configured to store the at least one self-executed routine on the distributed ledger of the distributed ledger architecture of the system.

8. The system of claim 7, wherein the processor is further configured to execute the at least one self-executed routine to facilitate generation of the at least one event based on processing of an activity transaction associated with the at least one self-executed routine.

9. The system of claim 1, wherein the first communication of the first activity included on the distributed ledger of the distributed ledger architecture is obtained by a full node communicatively linked to the at least one off-chain computing device.

10. The system of claim 1, wherein the processor is further configured to track a time taken to validate the first activity, and wherein the at least one off-chain computing device is configured to display the time taken to validate the first activity with the first communication.

11. The system of claim 1, wherein the processor is further configured to:
   process a second activity associated with the at least one self-executed routine and received by the system;
   determine, based on the processing, that the second activity corresponds to the at least one event based on the second activity comprising a second communication;
   validate, by utilizing the plurality of validators and based on the second activity being determined to correspond to the at least one event, data associated with the second activity for inclusion on the distributed ledger of the distributed ledger architecture without requiring the threshold level of consensus from the plurality of validators.

12. The system of claim 1, wherein the processor is further configured to generate a result object address associated with the first activity after processing and validating the first activity, wherein the first communication is retrievable via the result object address by a full node in communication with the at least one off-chain computing device.

13. A method, comprising:
   facilitating establishment of an event handler connection for at least one event associated with at least one self-executed routine of a distributed ledger architecture of a system comprising a distributed ledger, wherein the at least one event corresponds to presence of a communication in an activity associated with the system;

analyzing a first activity associated with the at least one self-executed routine and received by the system for inclusion of data associated with the first activity on the distributed ledger;

determining, based on the analyzing and by execution of the at least one self-executed routine, that the first activity corresponds to the at least one event based on the first activity including a first communication;

validating, by utilizing a plurality of validators and based on the first activity being determined to correspond to the at least one event, the data associated with first activity for inclusion on the distributed ledger of the distributed ledger architecture without requiring a threshold level of consensus from the plurality of validators; and including the data associated with the first activity on the distributed ledger of the distributed ledger architecture so that the first communication is made available to at least one off-chain computing device.

14. The method of claim 13, further comprising enabling the first communication to be provided to the at least one off-chain computing device in response to a remote procedure call.

15. The method of claim 13, further comprising executing the at least one self-executed routine upon receipt of the first activity associated with the at least one self-executed routine.

16. The method of claim 13, further comprising interrogating, after validating the data associated with the first activity for inclusion on the distributed ledger of the distributed ledger architecture, a result object address associated with the first activity to obtain the first communication.

17. The method of claim 13, further comprising receiving an acknowledgement from the at least one off-chain computing device after the at least one off-chain computing device obtains the first communication, accesses the first communication, or a combination thereof.

18. A non-transitory computer readable medium comprising instructions, which, when loaded and executed by a processor, cause the processor to be configured to:

receiving an activity comprising data for inclusion on a distributed ledger of a distributed ledger architecture of a system;

validating, by utilizing a plurality of validators and based on the activity corresponding to at least one event subscribed to by at least one computing device, the data associated with the activity for inclusion on the distributed ledger of the distributed ledger architecture without requiring a threshold level of consensus from the plurality of validators, wherein the at least one event corresponds to presence of a communication in the activity;

submitting the data associated with the activity for inclusion on the distributed ledger of the distributed ledger architecture so that the communication is made available to at least one off-chain computing device of the system; and receiving an acknowledgement from the at least one off-chain computing device that the communication has been accessed by the at least one off-chain computing device, obtained by the at least one off-chain computing device, or a combination thereof.

19. The non-transitory computer readable medium of claim 18, wherein the processor is further configured to analyze the activity to determine the presence of the communication in the activity.

20. The non-transitory computer readable medium of claim 18, wherein the processor is further configured to sign the activity utilizing an encrypted key.

* * * * *